Patented June 24, 1924.

1,498,856

UNITED STATES PATENT OFFICE.

JACOB S. ROBESON, OF PENNINGTON, NEW JERSEY.

ADHESIVE OR BINDING COMPOSITION AND PROCESS.

No Drawing. Application filed August 11, 1920. Serial No. 402,854.

*To all whom it may concern:*

Be it known that I, JACOB S. ROBESON, a citizen of the United States, and resident of Pennington, in the county of Mercer and State of New Jersey, have invented certain new and useful Improvements in Adhesive or Binding Compositions and Processes, of which the following is a specification.

In my prior Patent 1,069,031 issued July 29th, 1913, I have pointed out wherein a mixture of a clayey material and sulphite cellulose liquor possesses adhesive or binding properties considerably in excess of that of either substance used alone and I have disclosed and claimed a new plastic material including these ingredients, as an article of manufacture. Such a plastic material has only limited use and is difficult to properly mix with other materials to be bound or held together. I have now discovered a method whereby I can produce a new composition from sulfite cellulose liquor solids and clay or the like, which by reason of its being in the form of a dry powder and being made in a different way possesses marked advantages and very much greater capabilities of use and ease of handling or application.

My present novel composition is in the form of a dry powder or finely subdivided substance which may be easily stored, shipped or preserved without deterioration, for long periods of time and kept ready for use when needed. While in this condition, it may be easily mixed in any desired proportions with other finely subdivided substance with which it is to be used as a powder, such for instance as core sand for foundrymen's use, coal dust or other finely subdivided material for fuel briquets, road surfacing material, or other material or mass to be bound or held together temporarily or permanently. If the material which is to be bound together is in a dry state when mixed with my novel binder powder, the mixture may be moistened and then worked, compressed, shaped or otherwise brought to the desired form. The product is then dried or otherwise treated dependent on the article being produced.

If the material to be bound is already sufficiently moist or if there be an excess of water present, such for instance, in a pulpy or semi-liquid mass, the mixing may be easily accomplished and no additional or later moistening is needed.

In making my improved binder powder, I mix a material including mineral colloids, such as clay, with an organic colloid, preferably sulfite cellulose liquor or powder obtained from the same, the mixture being in the proper proportions depending on the concentration and specific character of the ingredients. A sufficient amount of water is added with, or separate from, the other two ingredients and after thorough mixing, the mass is dried to a hard solid form. Then or sometime prior to use, it is pulverized or ground to a powder of the desired fineness and is ready for storage, shipment or use. Obviously, it may be stored or shipped prior to being reduced to the finely subdivided state. It does not deliquesce to any material extent or deteriorate and may be kept for a long period of time. Being in a dry finely subdivided state, it may be easily weighed out or measured so that the exact amount to be added as a binder is easily obtained by the use of scales or dry measure.

The binder is not a mere mechanical mixture of the ingredients but is a chemical compound or mixture of compounds. I do not know just what chemical reaction takes place but there is some union or reaction of the salts of so-called ligno-sulfonic acids of the sulfite cellulose liquor and the collodial inorganic ingredient. Such compound or compounds have greater adhesive or binding effect than the sum of the effects of the separate ingredients.

Although I preferably use a clayey material, such as a terra-cotta clay or semi-decomposed feldspathic material containing mineral collodial ingredients, as the mineral constituent of the powder, particularly for a binder for core sand, I may use purer forms of these or other mineral colloids such as very fine ground quartz, finely ground oxid of iron, or silicates of alumina, potash, soda, iron, etc. The sulfite cellulose constituent may be used as a liquor, either unconcentrated or untreated, or after concentration or treatment to remove acidity and increase colloidal character or the dry sulfite cellulose powder produced by the evaporation of the sulfite cellulose liquor may be used. Preferably such a quantity of the sulfite cellulose constituent is used as will represent about twenty to thirty per cent of solid matter. Twenty per cent of concentrated liquor is sufficient with a very plastic clay, such as terra-cotta clay. The proportions of the binder powder to the inorganic mass to be bound will vary within wide limits. For a foundry core for iron casting, the use of about one part of binder to fifty parts of sand of good quality will ordinarily make a good core. Such a core will retain its form while the casting is being poured, is not hydroscopic to an objectionable degree, is sufficiently fragile to be easily broken out after the casting is made, does not materially change shape or proportions between the time it is made and the time the casting is poured, and is sufficiently porous to permit the escape of gas when the metal is poured.

Having thus described my invention, what I claim as new and desire to secure by Letters Patent is:

1. A new binding agent, an intimate mixture of the solid constituents of sulfite cellulose liquor and terra-cotta clay in dry finely subdivided form.

2. A new binding agent, including in dry, finely subdivided form approximately twenty per cent of solid matter from sulfite cellulose liquor, and approximately eighty per cent of terra-cotta clay.

3. A new composition of matter for use as a binding agent, said composition being in dry powdered form and comprising a reaction product of sulfite cellulose liquor solids, and a collodial inorganic material in the presence of moisture.

4. A new composition of matter for use as a binding agent, said composition being in dry, finely sub-divided form and comprising a compound of colloidal inorganic and colloidal organic matter.

5. A new composition of matter for use as a binding agent, said composition being in dry, powdered form and comprising a reaction product of sulfite cellulose liquor solids and clay, in the presence of moisture.

6. The new process of preparing a binding or adhesive material which consists in intimately mixing sulfite cellulose liquor and clay in the presence of moisture, drying the mixture, and reducing it to powder form.

7. The process of preparing a binding or adhesive material which consists in mixing an inorganic colloidal substance, and sulfite cellulose liquor in the presence of moisture, drying to remove said moisture and pulverizing.

8. The process of preparing core sand for use, consisting in mixing clay and sulfite cellulose liquor in the presence of moisture, drying to remove said moisture, reducing to powdered form and mixing the powder with core sand and water.

Signed at New York, in the county of New York and State of New York, this 9th day of August, A. D. 1920.

JACOB S. ROBESON.